US007297057B2

(12) United States Patent
Gerrard et al.

(10) Patent No.: US 7,297,057 B2
(45) Date of Patent: Nov. 20, 2007

(54) APPARATUS AND METHOD FOR POKER GAME WITH ADDITIONAL DRAW CARD OPTIONS

(75) Inventors: Peter Gerrard, Prestwich (GB); Dov L. Randall, Whitefield (GB)

(73) Assignee: IGT, Reno, NV (US)

( * ) Notice: Subject to any disclaimer, the term of this patent is extended or adjusted under 35 U.S.C. 154(b) by 622 days.

(21) Appl. No.: 10/632,731

(22) Filed: Jul. 31, 2003

(65) Prior Publication Data

US 2005/0026665 A1 Feb. 3, 2005

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ........................................................ 463/13

(58) Field of Classification Search .................. 463/13
See application file for complete search history.

(56) References Cited

U.S. PATENT DOCUMENTS

| | | | | |
|---|---|---|---|---|
| 3,876,208 | A * | 4/1975 | Wachtler et al. | 463/13 |
| 3,998,462 | A | 12/1976 | Goott | |
| 4,648,604 | A | 3/1987 | Horan | |
| 4,743,022 | A * | 5/1988 | Wood | 463/13 |
| 4,861,041 | A | 8/1989 | Jones et al. | |
| 4,948,128 | A | 8/1990 | Emery, II et al. | |
| 4,948,134 | A | 8/1990 | Suttle et al. | |
| 5,014,988 | A | 5/1991 | Mirando et al. | |
| 5,019,973 | A * | 5/1991 | Wilcox et al. | 463/13 |
| 5,022,653 | A | 6/1991 | Suttle et al. | |
| 5,042,818 | A | 8/1991 | Weingardt | |
| 5,098,107 | A | 3/1992 | Boylan et al. | |
| 5,100,137 | A | 3/1992 | Fulton | |
| 5,118,109 | A | 6/1992 | Gumina | |
| 5,118,114 | A | 6/1992 | Tucci | |
| 5,167,413 | A | 12/1992 | Fulton | |
| 5,188,363 | A | 2/1993 | Marnell, II et al. | |
| 5,248,142 | A | 9/1993 | Breeding | |
| 5,251,897 | A | 10/1993 | Fulton | |
| 5,255,915 | A | 10/1993 | Miller | |
| 5,286,023 | A | 2/1994 | Wood | |
| 5,294,120 | A | 3/1994 | Schultz | |
| 5,308,065 | A | 5/1994 | Bridgeman et al. | |
| 5,356,140 | A | 10/1994 | Dabrowski et al. | |
| 5,382,025 | A | 1/1995 | Sklansky et al. | |
| 5,411,257 | A | 5/1995 | Fulton | |
| 5,415,404 | A | 5/1995 | Joshi et al. | |
| 5,437,451 | A | 8/1995 | Fulton | |
| 5,451,054 | A | 9/1995 | Orenstein | |
| 5,486,005 | A | 1/1996 | Neal | |
| 5,489,101 | A | 2/1996 | Moody | |

(Continued)

*Primary Examiner*—Robert E. Pezzuto
*Assistant Examiner*—Omkar A. Deodhar
(74) *Attorney, Agent, or Firm*—Bell, Boyd & Lloyd LLP

(57) ABSTRACT

A gaming device having a poker game with multiple options for the player to purchase extra cards. In one embodiment a stud five card hand is dealt to the player. The player can keep the five cards or purchase an extra card at a first cost. If the player purchases the first card, the player can thereafter keep the six card hand or purchase a second card at a second higher cost. This cycle is repeated for up to a predetermined number of cards such as five additional cards in one embodiment. When five additional cards are purchased, the game provides any accrued award to the player.

57 Claims, 5 Drawing Sheets

U.S. PATENT DOCUMENTS

| | | | | |
|---|---|---|---|---|
| 5,531,440 | A | 7/1996 | Dabrowski et al. | |
| 5,531,441 | A | 7/1996 | Dabrowski et al. | |
| 5,542,669 | A | 8/1996 | Charron et al. | |
| 5,544,892 | A | 8/1996 | Breeding | |
| 5,570,885 | A | 11/1996 | Ornstein | |
| 5,573,249 | A | 11/1996 | Johnson | |
| 5,732,950 | A * | 3/1998 | Moody | 273/292 |
| 5,816,915 | A | 10/1998 | Kadlic | |
| 5,816,916 | A | 10/1998 | Moody | |
| 5,820,460 | A | 10/1998 | Fulton | |
| 5,823,873 | A | 10/1998 | Moody | |
| 5,839,732 | A | 11/1998 | Guidi | |
| 5,845,907 | A | 12/1998 | Wells | |
| 5,868,618 | A | 2/1999 | Netley et al. | |
| 5,868,619 | A | 2/1999 | Wood et al. | |
| 5,882,260 | A | 3/1999 | Marks et al. | |
| 5,897,436 | A | 4/1999 | Singer et al. | |
| 5,908,353 | A | 6/1999 | Andrews | |
| 5,911,419 | A | 6/1999 | Delaney et al. | |
| 5,921,550 | A | 7/1999 | Awada | |
| 5,947,821 | A * | 9/1999 | Stone | 463/13 |
| 5,947,822 | A | 9/1999 | Weiss | |
| 5,951,012 | A | 9/1999 | Feola | |
| 5,964,464 | A | 10/1999 | Jones | |
| 5,971,849 | A | 10/1999 | Falciglia | |
| 5,975,529 | A | 11/1999 | de Keller | |
| 5,988,643 | A | 11/1999 | Awada | |
| 5,997,002 | A | 12/1999 | Goldman | |
| 6,007,066 | A | 12/1999 | Moody | |
| 6,007,424 | A | 12/1999 | Evers et al. | |
| 6,012,719 | A | 1/2000 | Webb | |
| 6,012,720 | A | 1/2000 | Webb | |
| 6,019,374 | A | 2/2000 | Breeding | |
| 6,045,129 | A | 4/2000 | Cooper et al. | |
| 6,048,267 | A | 4/2000 | Wichinsky | |
| 6,050,568 | A | 4/2000 | Hachquet | |
| 6,056,641 | A | 5/2000 | Webb | |
| 6,062,980 | A | 5/2000 | Luciano | |
| 6,079,711 | A | 6/2000 | Wei et al. | |
| 6,093,100 | A | 7/2000 | Singer et al. | |
| 6,098,985 | A | 8/2000 | Moody | |
| 6,110,040 | A | 8/2000 | Sanduski et al. | |
| 6,129,357 | A | 10/2000 | Wichinsky | |
| 6,131,907 | A | 10/2000 | Nucifora et al. | |
| 6,131,908 | A | 10/2000 | Palmer | |
| 6,132,311 | A | 10/2000 | Williams | |
| 6,135,882 | A | 10/2000 | Kadlic | |
| 6,135,883 | A | 10/2000 | Hachquet | |
| 6,146,271 | A | 11/2000 | Kadlic | |
| 6,149,157 | A | 11/2000 | Suan | |
| 6,149,521 | A | 11/2000 | Sanduski | |
| 6,173,955 | B1 | 1/2001 | Perrie et al. | |
| 6,176,781 | B1 * | 1/2001 | Walker et al. | 463/13 |
| 6,206,374 | B1 | 3/2001 | Jones | |
| 6,206,780 | B1 | 3/2001 | Awada | |
| 6,220,959 | B1 | 4/2001 | Holmes, Jr. et al. | |
| 6,227,969 | B1 * | 5/2001 | Yoseloff | 463/13 |
| 6,237,916 | B1 | 5/2001 | Webb | |
| 6,248,016 | B1 | 6/2001 | Walker et al. | |
| 6,257,979 | B1 | 7/2001 | Walker et al. | |
| 6,270,078 | B1 | 8/2001 | Leone et al. | |
| 6,270,079 | B1 | 8/2001 | Chamberlain | |
| 6,270,405 | B1 | 8/2001 | Ferguson | |
| RE37,414 | E | 10/2001 | Harlick | |
| 6,299,532 | B1 | 10/2001 | Smith | |
| 6,305,686 | B1 | 10/2001 | Perrie et al. | |
| 6,322,445 | B1 | 11/2001 | Miller | |
| 6,332,614 | B1 | 12/2001 | Hesse | |
| 6,332,839 | B2 | 12/2001 | Walker et al. | |
| 6,334,613 | B1 | 1/2002 | Yoseloff | |
| 6,334,614 | B1 | 1/2002 | Breeding | |
| 6,336,859 | B2 | 1/2002 | Jones et al. | |
| 6,342,007 | B1 | 1/2002 | Wood et al. | |
| 6,345,823 | B1 | 2/2002 | Webb | |
| 6,358,144 | B1 | 3/2002 | Kadlic et al. | |
| 6,371,851 | B1 | 4/2002 | Singer et al. | |
| 6,402,150 | B1 | 6/2002 | Jones | |
| 6,405,174 | B1 | 6/2002 | Walker et al. | |
| 6,406,023 | B1 | 6/2002 | Rowe | |
| 6,409,173 | B1 | 6/2002 | Tri | |
| 6,409,174 | B1 | 6/2002 | Demarest | |
| 6,416,407 | B1 | 7/2002 | Carrico et al. | |
| 6,428,002 | B1 | 8/2002 | Baranauskas | |
| 6,435,506 | B1 | 8/2002 | Piccoli | |
| 6,443,456 | B1 | 9/2002 | Gajor | |
| 6,461,240 | B1 | 10/2002 | Perkins | |
| 6,478,675 | B1 * | 11/2002 | Awada | 463/13 |
| 6,533,658 | B1 * | 3/2003 | Walker et al. | 463/13 |
| 6,923,446 | B2 * | 8/2005 | Snow | 273/292 |
| 7,000,921 | B2 * | 2/2006 | Schultz | 273/292 |
| 2002/0082069 | A1 * | 6/2002 | Parker | 463/13 |
| 2003/0073476 | A1 * | 4/2003 | Friedman | 463/13 |
| 2004/0130023 | A1 * | 7/2004 | Naiki | 257/737 |

* cited by examiner

FIG. 4

| WAGERS | | PAYS | |
|---|---|---|---|
| INITIAL | - 1 CREDIT | ROYAL FLUSH | - 1000 CREDITS |
| 1st ADDED CARD | - 1 CREDIT | STRAIGHT FLUSH | - 50 CREDITS |
| 2nd ADDED CARD | - 2 CREDITS | 4 OF A KIND | - 40 CREDITS |
| 3rd ADDED CARD | - 4 CREDITS | FULL HOUSE | - 30 CREDITS |
| 4th ADDED CARD | - 8 CREDITS | FLUSH | - 20 CREDITS |
| 5th ADDED CARD | - 16 CREDITS | STRAIGHT | - 10 CREDITS |
| TOTAL FOR FIVE CARDS | - 32 CREDITS | 3 OF A KIND | - 5 CREDITS |
| | | 2 PAIRS | - 3 CREDITS |
| | | PAIR OF ACES | - 2 CREDITS |

FIG. 5

| | TOTAL WAGER | TRIAL 1 | TRIAL 2 | TRIAL 3 | TRIAL 4 |
|---|---|---|---|---|---|
| PRE-OPTION HAND | 1 CREDIT | QH, 7H, 3C, 2S, 2D<br>BEST WIN = 0 | AS, 4H, 9D, JD, 6D<br>BEST WIN = 0 | 9S, KS, 7D, 7S, 6C<br>BEST WIN = 0 | JH, KD, 5H, 5D, KH<br>BEST WIN = 3 |
| HAND + 1 CARD | 2 CREDITS | QH, 7H, 3C, 2S, 2D, 10H<br>BEST WIN = 0 | AS, 4H, 9D, JD, 6D, 2H<br>BEST WIN = 0 | 9S, KS, 7D, 7S, 6C, 9C<br>BEST WIN = 3 | KEEP |
| HAND + 2 CARDS | 4 CREDITS | QH, 7H, 3C, 2S, 2D, 10H, 4C<br>BEST WIN = 0 | AS, 4H, 9D, JD, 6D, 2H, AH<br>BEST WIN = 2 | KEEP | |
| HAND + 3 CARDS | 8 CREDITS | FOLD | AS, 4H, 9D, JD, 6D, 2H, AH, QD<br>BEST WIN = 2 | | |
| HAND + 4 CARDS | 16 CREDITS | | AS, 4H, 9D, JD, 6D, 2H, AH, QD, 6H<br>BEST WIN = 3 | | |
| HAND + 5 CARDS | 32 CREDITS | | AS, 4H, 9D, JD, 6D, 2H, AH, QD, 6H, 6C<br>BEST WIN = 30 | | |
| PAYOUT (IF ANY) | | NO CREDITS | 30 CREDITS | 3 CREDITS | 3 CREDITS |

APPARATUS AND METHOD FOR POKER GAME WITH ADDITIONAL DRAW CARD OPTIONS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to a poker game with additional draw card options.

Gaming device manufacturers strive to make gaming devices that provide as much enjoyment and excitement as possible. Video poker machines used for gaming are well known in the art. Most conventional video poker gaming machines used in casinos implement conventional rules for poker by dealing five initial cards face up from a standard deck of fifty-two cards and allowing the player to hold any number of the dealt cards. The player can press a draw button which causes the non-held or discarded cards to be randomly replaced with new cards from the deck. The player is provided an award for a winning hand, if any, according to a payout table.

In a conventional video poker game, when a player is dealt three cards or four cards to a winning hand, such as a Royal Flush, the odds are against the player completing the hand and hitting the winning hand. For example, the odds of being dealt a Royal Flush in a five card hand is 1 in 650,000. In a typical single-hand video poker game, the player only gets one chance or draw, resulting in a very high chance of failure and frequent disappointment for the player.

Another known poker game is described in U.S. Pat. No. 4,743,022. That patent describes one expanded type draw poker game, wherein the player makes a first wager and receives five cards. The player may then discard up to five cards and receive draw cards to form a second hand. The second hand is compared to a posted, fixed, paytable to determine if the player has lost the first wager, or if the player has won according the paytable.

If after the draw the second hand achieves a ranking of a straight or higher, the game provides the player an option. The option enables the player to place a second wager and draw a sixth card to form a third hand. The third hand consists of the five cards in the second hand plus the sixth card. To win after exercising the option and placing the second wager, the player has to achieve a ranking that is higher than the requirement for the first wager.

The above-described game increases the opportunities for players to win awards associated with poker versus standard draw poker. The game tends to increase fun and excitement associated with gaming, which is desirable. It is also desirable to make games relatively simple and easy to follow, which can be a shortcoming of games that add opportunity but also add complexity. A continuing need therefore exists to provide new, fun and entertaining extended type poker games, which are relatively easy to play and follow.

SUMMARY OF THE INVENTION

The present invention provides a gaming device having a poker game with multiple options for the player to purchase extra cards. In one embodiment, a five card stud hand is dealt to the player from a conventional virtual deck of fifty-two playing cards. The player can keep the five cards or purchase an extra card at a first cost. If the player purchases the first card, the player can thereafter keep the six card hand or purchase a second card at a second higher cost. This cycle is repeated for up to a total of five additional cards in one embodiment. When five additional cards are purchased, the game provides any accrued win to the player.

In one embodiment, the gaming device deals a second hand of cards face down after dealing the first five cards face up. In one embodiment, if the player chooses to purchase a card, the gaming device reveals one of the face down cards in a predetermined manner, such as from left to right. In another embodiment, if the player selects to purchase one of the cards, the gaming device selects a card to reveal randomly from the face down set. In a further embodiment, the player selects which card of the face down set to reveal and add to the initially displayed face up cards.

In one embodiment, the number of cards dealt face down equals the number of cards dealt initially face up. That is, if the gaming device initially deals five cards face up, the game thereafter deals five cards face down. In alternative embodiments, the gaming device deals more or less cards face down than are dealt initially face up.

In still another embodiment, the gaming device does not deal a second set of cards face down, rather, the gaming device selects the next card from the top of the deck to reveal. In any case, the additional card or cards are evaluated in combination with the initially dealt face up cards to determine a best win possible for the player.

The gaming device provides the player with a number of options while playing the game of the present invention. First, the player can stop at any time and keep any accrued win. Second, the player can fold at any time, receiving no payout, but accruing no additional costs. Third, the player is not forced to stop at any particular win and can continue purchasing new cards regardless of any previously accrued win.

While the card game of the present invention is played in one preferred embodiment in a stud poker fashion, the additional cards and wagers of the present invention can alternatively be played with draw poker or other suitable types of poker. For purposes of describing the present invention, the term "pre-option" hand refers to the hand that exists either after the initial hand or number of cards are dealt or after the player has replaced any additionally dealt cards with one or more draw cards. That is, the pre-option hand refers to the hand that the player holds prior to the purchase of any additional cards. Furthermore, while one preferred embodiment includes a pre-option hand of five cards, the pre-option hand can include any suitable number of cards, such as two cards, three cards, seven cards or nine cards.

Moreover, while the embodiments described herein are implemented in a video gaming machine in one preferred embodiment, the game may also be played over an internet or live at a casino or other gaming establishment.

Additional features and advantages of the present invention are described in, and will be apparent from, the following Detailed Description of the Invention and the figures.

BRIEF DESCRIPTION OF THE DRAWINGS

FIG. 4 is a schematic diagram illustrating one embodiment for pricing the additional wagers and setting the payouts of the multiple additional card option poker games of the present invention.

FIG. 5 is a table illustrating multiple trials of the additional card option poker game of the present invention in a stud poker embodiment.

DETAILED DESCRIPTION OF THE INVENTION

Gaming Device and Electronics

Figure 1A:
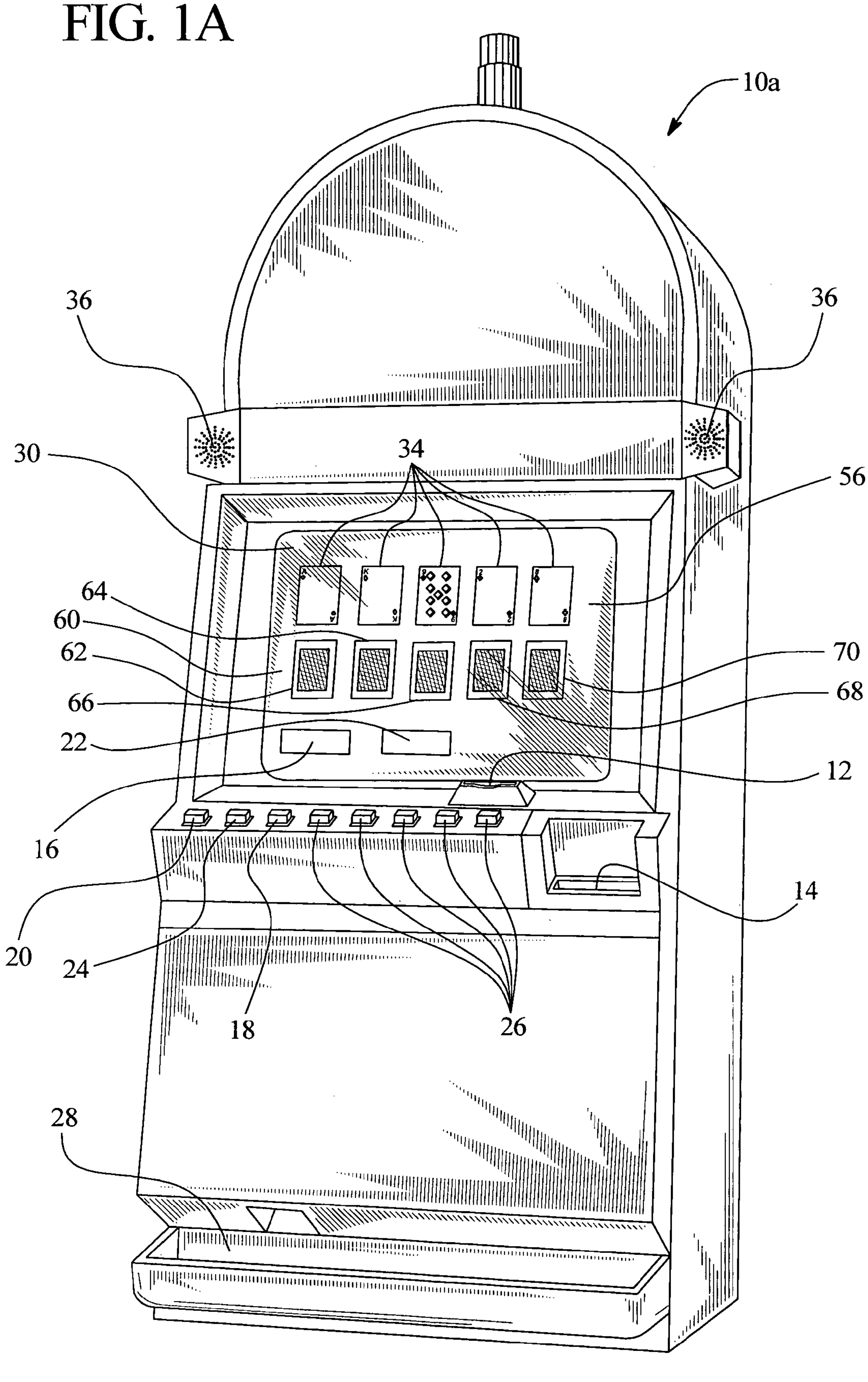
FIG. 1A is a front perspective view of one stud poker embodiment of the gaming device of the present invention.
Figure 1B:
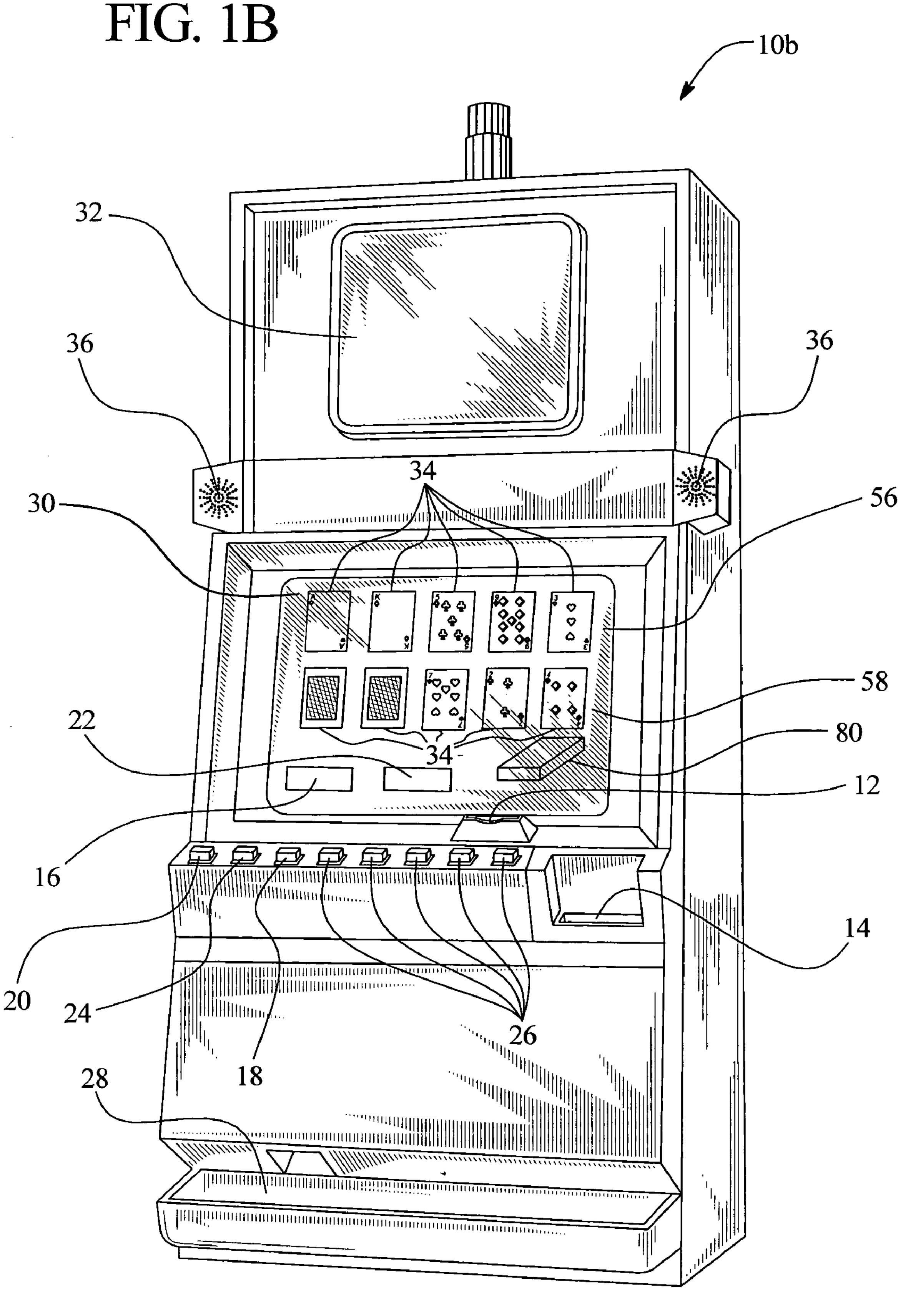
FIG. 1B is a front perspective view of one draw poker embodiment of the gaming device of the present invention.

Referring now to the drawings, two primary embodiments of the gaming device of the present invention are illustrated in FIGS. 1A and 1B as gaming device 10*a* (stud poker) and gaming device 10*b* (draw poker), respectively. Gaming device 10*a* and/or gaming device 10*b* are collectively referred to herein as gaming device 10. Gaming device 10 in one embodiment has the controls, displays and features of a conventional video poker machine. It is constructed so that a player can operate it while standing or sitting. Gaming device 10 is mounted in a cabinet in one embodiment.

It should be appreciated however that gaming device 10 can be constructed as a pub-style table-top game (not shown) which a player can operate while sitting. Furthermore, gaming device 10 can be constructed with varying cabinet and display designs, as illustrated by the designs shown in FIGS. 1A and 1B. The game of gaming device 10 can also be implemented as a program code stored in a detachable cartridge for operating a hand-held video game device. Also, the game of gaming device 10 can be implemented as a program code stored on a disk or other memory device which a player can use in a desktop or laptop personal computer or other computerized platform. Further, the game of gaming device 10 can be played over a data network, such as an internet, or be played live at a casino or gaming establishment.

As illustrated in FIGS. 1A and 1B, gaming device 10 includes a coin slot 12 and bill acceptor 14, wherein the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pushing a play or deal button 20. The play or deal button 20 can be any activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators, such as a bet max button may also be employed in the gaming device of present invention.

A player may cash out and thereby receive a number of coins corresponding to the number of remaining credits by pushing a cash out button 18. When the player cashes out, the player receives the coins in a coin payout tray 28. The gaming device 10 may employ other payout mechanisms such as credit slips redeemable by a cashier or electronically recordable cards that keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 in one embodiment displays a plurality of cards 34 in video form on one or more of the display devices 30 or 32. The display device is any known type of video monitor, such as a liquid crystal display, etc. In FIG. 1B, one of the display devices 30 or 32 could be a video monitor, while to other is a mechanical or electromechanical display. Or, both monitors could be video monitors.

The cards 34 are associated with one or more decks of cards such as fifty-two cards. The cards can appear as standard cards used in conventional poker games. The cards 34 may alternatively display a variety of images such as bells, hearts, fruits, numbers, letters or other images that correspond to a theme associated with gaming device 10.

Figure 2:
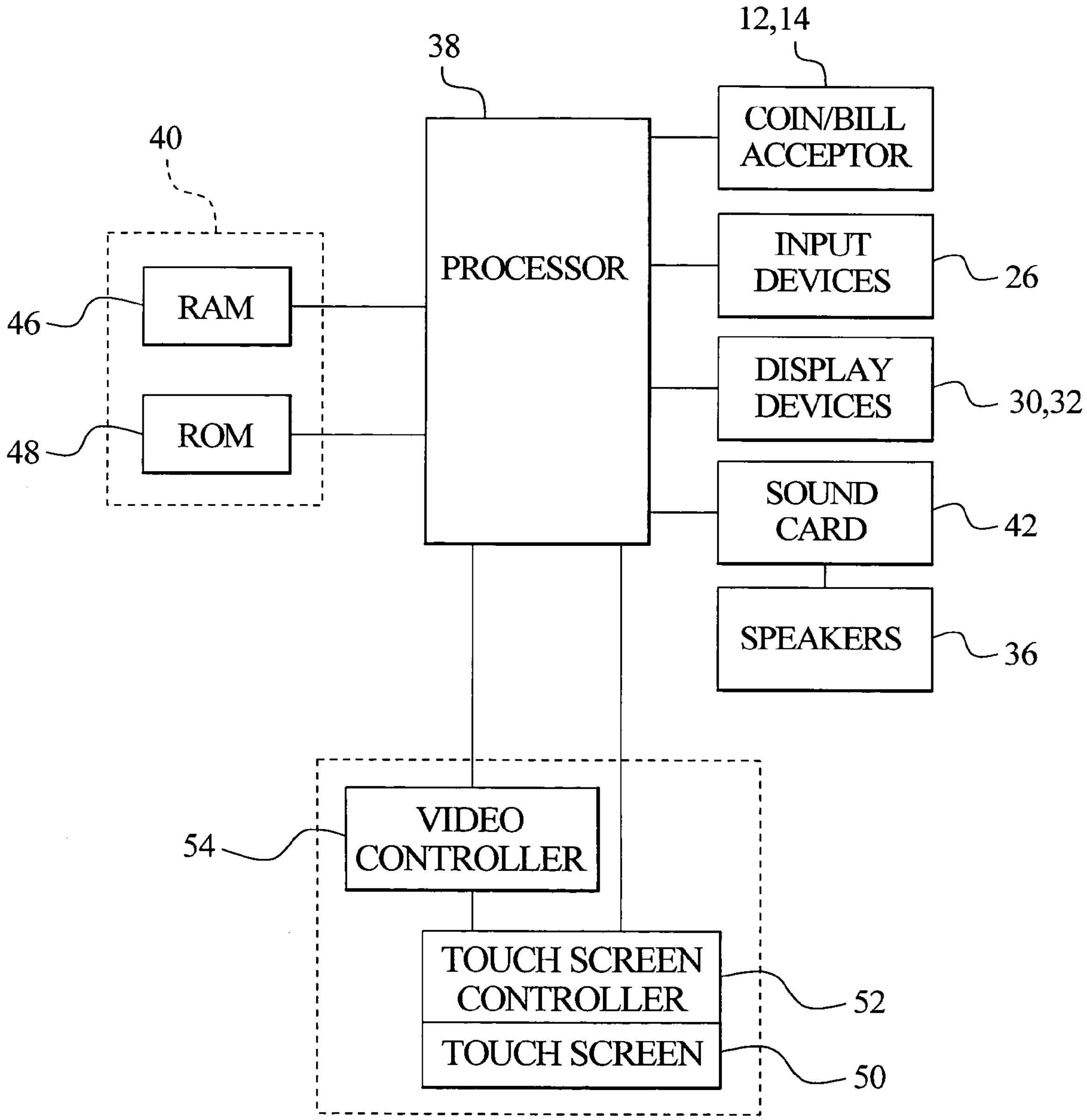
FIG. 2 is a schematic block diagram of the electronic configuration of one embodiment of the gaming device of the present invention.

Referring now to FIG. 2, one electronic configuration of gaming device 10 includes: a processor 38, a memory device 40 for storing program code or other data, a central display device 30, an upper display device 32, a sound card 42, a plurality of speakers 36 for producing sounds and/or music, and one or more input devices 44. The processor 38 is a microprocessor or microcontroller-based platform in one embodiment, which is capable of displaying images, symbols and other indicia such as images of people, characters, places, things and faces of cards.

One or more secondary processors may also be employed in conjunction with the primary processor to control certain aspects of gaming device 10. The memory device 40 can include random access memory (RAM) 46 for storing event data or other data generated or used during a particular game. The memory device 40 can also include read only memory (ROM) 48 for storing program code that controls gaming device 10 so that it plays a particular game in accordance with applicable game rules and paytables. The memory device 40 preferably stores program code that enables a player to play a video poker game.

As illustrated in FIG. 2, the player uses the input devices 44, such as the deal button 20, the bet one button 24, the hold button 26 and the cash out button 18 to input signals into gaming device 10. Those buttons and any input devices 44 are simulated on a touch screen or are electromechanical devices as desired. In certain instances, it is desirable to use a touch screen 50 and an associated touch screen controller 52 to operate with the video monitor display devices 30 and 32. Touch screen 50 and touch screen controller 52 are connected to a video controller 54 and processor 38. A player can make decisions and input signals into gaming device 10 by touching touch screen 50 at the appropriate places. As further illustrated in FIG. 2, the processor 38 is connected to coin slot 12 or bill acceptor 14. The processor 38 is programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 reside on each gaming device

10 unit in one embodiment, it is possible to provide some or all of their functions at a central location such as a network server for communication to a playing station, e.g., over a local area network (LAN), wide area network (WAN), internet connection, microwave link, and the like. The processor 38 and memory device 40 are generally referred to herein as the "computer" or "controller."

With reference to FIGS. 1A, 1B and 2, to operate the gaming device 10, the player in one embodiment inserts the appropriate amount of money or tokens at coin slot 12 or bill acceptor 14 and then pushes the deal button 20. Gaming device 10 deals an initial hand 56 of, e.g., five cards 34 all face up from a single fifty-two card deck. Hand 56 includes alternatively any suitable number of cards, such as two to seven cards. In one preferred embodiment shown in FIG. 1A, hand 56 having five cards 34 is evaluated on a stud basis. Gaming device 10*a* then provides the player a series of options, illustrated below, to purchase additional cards.

In another embodiment illustrated in FIG. 1B, gaming device 10*b* provides a draw poker game. With draw poker, gaming device 10*b* deals the initial hand 56 to the player. The player selects, e.g., via touch screen 50, one or more or all of the five cards 34 of hand 56 to replace. Gaming device 10 in one embodiment requires the player to at least be dealt an ace to replace all five cards. The player keeps the any desired cards by pressing a hold button, e.g., one of the electromechanical buttons 26 or an appropriate area of touch screen 50. The player then presses the deal button 20 (or appropriate area of touch screen 50) and the unwanted or discarded cards 34 are removed from the display device 30 and replacement cards 34 are dealt from the remaining cards in the deck to form a second hand 58 (both hands 56 and 58 shown in FIG. 1B for illustration purposes). Gaming device 10 then provides the series of options discussed below to purchase additional cards.

Gaming device 10A of FIG. 1A illustrates one possible embodiment for providing the additional cards of the poker game of the present invention. FIG. 10A illustrates a set of cards 60 that is dealt face down after the stud hand 56 of cards 34 is dealt face up to the player. The set of cards 60 is the set from which the player receives additional cards. The possible additional cards of the set 60 include, from left to right, card 62, card 64, card 66, card 68 and card 70.

In one embodiment, if the player chooses to purchase a first additional card, gaming device 10A turns over the card in a predetermined format. For example, gaming device 10A can turn the additional cards over from left to right, right to left or in any other desired predetermined sequence. In another embodiment, gaming device 10A selects one of the cards 62 to 70 randomly when the player decides to purchase an additional card. In a further alternative embodiment, the player selects which of the cards 62 to 70 to add to the initially dealt hand 56, for example, by touching one of the cards 62 to 70 if display device 30 operates with a touch screen 50. Alternatively, one of the electromechanical input devices 26 may be provided for each one of the cards 62 to 70, wherein the player selects a desired one of the cards via an associated electromechanical pushbutton 26.

Gaming device 10B of FIG. 1B illustrates another alternative embodiment for providing the purchased additional cards of the present invention. Gaming device 10B illustrates a virtual deck of cards 80. The initially dealt cards 34 of hand 56 and the draw cards 34 of hand 58 are dealt from deck 80. Thus, assuming deck 80 is a standard fifty-two card deck, and given that the player has discarded three cards in FIG. 1B (five of clubs, nine of diamonds and three of hearts) and replaced those same three cards (seven of spades, two of clubs and four of diamonds), deck 80 has thirty-nine remaining cards in FIG. 1B. For purposes of illustration virtual deck 80 is shown. However, deck 80 in an embodiment is not illustrated but rather the purchased additional cards simply appear when selected.

For purposes of describing the present invention, the term "pre-option hand" refers to the hand prior to the purchase of additional cards, such as the stud hand 56 in FIG. 1A and the hand 58 created via the two held queens and the three draw cards 34 shown in FIG. 1B. Both of the hands 56 in FIGS. 1A and 58 in FIG. 1B are pre-option hands in the respect that neither includes an additionally purchased card of the present invention. It should be appreciated, however, that the additional cards of the present invention are operable with either stud, draw or other suitable types of poker.

The gaming device 10, in certain embodiments, includes any suitable secondary or bonus triggering events, secondary bonus games as well as any progressive game coordinating with the primary or secondary games. The additional, purchasable cards of the present invention may be implemented as a primary or bonus game. If a primary game, the poker game operates with one or more bonus games. For example the achievement of a certain hand by the player can trigger a separate bonus game. Or, the bonus occurs during play of the poker game of the present invention, e.g., after drawing a particular card. If a bonus game, the poker game of the present invention operates with the primary or base games of slot, poker, craps, blackjack, keno, bingo, bunco, any other primary game, and any combination thereof. In one embodiment, the base game is provided on the central display device 30, while the bonus game is played on the upper display device 32 (FIG. 1B).

Figure 3:
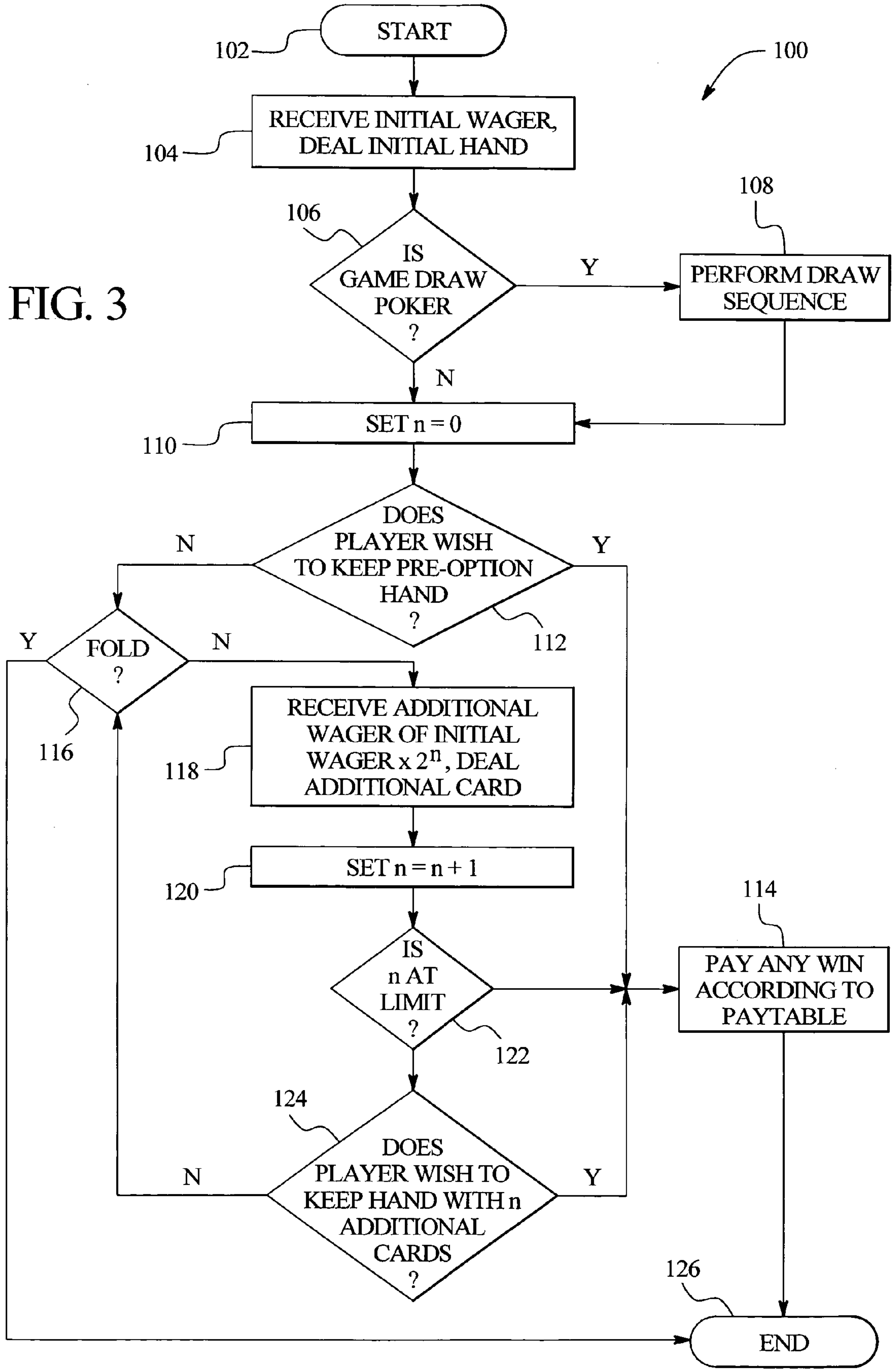
FIG. 3 is a schematic flow diagram illustrating various embodiments of the additional card option poker game of the present invention.

Referring now to FIG. 3, one method 100 for performing the optional purchase card sequence of the present invention is illustrated. After starting the game as indicated by oval 102, the gaming device receives an initial wager and deals an initial hand as indicated by block 104. If the game is a draw poker game as determined in connection with diamond 106, the gaming device performs a known draw sequence as indicated by block 108. If the game is not a draw poker game or after the draw sequence, the gaming device begins the option sequence wherein an indexer "n" is set initially to zero as indicated by block 110.

Next, it is determined whether the player wishes to keep the pre-option hand as determined in connection with diamond 112. That is, the player has the option to keep the initially displayed stud hand 56 in FIG. 1A or the draw hand 58 in FIG. 1B. The gaming device of the present invention does not require the player to purchase any additional cards. Thus, if the player selects to keep the pre-option hand, the gaming device pays any win according to a paytable as indicated by block 114. One example of a paytable is illustrated below in connection with FIG. 4.

If the player does not wish to keep the pre-option hand, the player is also provided with the option to fold as determined in connection with diamond 116. The fold option enables the player to walk away from the game, without any win, but without incurring any more cost due to the purchase of an additional card. If the player decides to fold, the game of the present invention ends as indicated by oval 126. If the player decides not to fold, then the player has made the decision to purchase an additional card as indicated by block 118.

To purchase an additional card, the gaming device receives an additional wager. Those of skill in the art will appreciate that there may be multiple ways to structure the paytable and wager schedule in order to provide a game that is pleasurable for the player to play in terms of having a desirable pay back percentage but also so that the gaming device is profitable for the casino and the gaming device manufacturer. FIGS. 3 and 4 set forth one possible wagering schedule, wherein the additional card costs the initial wager amount multiplied by $2^n$. For example, when "n"=0 on the first pass, $2^0=1$, so that the wager for the first additional card equals one times the initial wager amount, for example one credit. Upon receiving the additional wager, the gaming device sets "n" to equal "n"+one as indicated by block 120.

Next, the gaming device determines if "n" is at a predefined limit as determined in connection with diamond 122. The predefined limit is illustrated in FIG. 1A via the set 60 of five cards 62 to 70. That is, the game of FIG. 1A sets a predetermined limit of five additional, purchasable cards. In FIG. 3, if "n" is at the limit, for example if "n"=5, the gaming device pays any accrued win as indicated by block 114 and ends the game as indicated by oval 126.

If "n" has not reached the limit, the gaming device determines whether or not the player wishes to keep the hand with "n" additional cards. If the player wishes to keep the hand with "n" additional cards, the gaming device pays any accrued win according to the paytable as indicated by block 114 and the game ends as indicated by oval 126. If the player does not wish to keep the hand with "n" additional cards, there are two possibilities. First, if the player has accrued no win, the player may wish to fold as determined in connection with diamond 116. If the player does not wish to fold then the player wishes to receive another additional card as indicated by block 118, wherein the purchase option sequence previously described is repeated.

On the second pass "n"=$2^1$, so that second card costs two times the initial wager amount or two credits. When n=2, i.e., on the third time through the loop, the wager is $2^2$ or four credits and so on. Eventually, the player either folds, keeps a desired accrued win or "n" reaches the limit, wherein the player is provided any accrued win. It should be appreciated that gaming device 10 provides much flexibility to the player to either fold out of an undesirable situation, keep a desirable win or continue gaming to either increase an already accrued win or to attempt to obtain a win that exceeds the player's total wager.

Referring now to FIG. 4, a chart showing the wager schedule described previously in connection with FIG. 3 as well as one embodiment for a paytable of the present invention is illustrated. The wager table illustrates that if the player purchases all five potential additional cards, the player's total wager is thirty-two credits.

The paytable portion of FIG. 4 illustrates that if the player purchases all five cards, the player needs to achieve at least four-of-a-kind to win more than the player has wagered (40 versus 32 credits). If the player purchases only four additional cards, the player needs to achieve at least a flush in order to win more than the player has wagered (20 versus 16 credits). If the player purchases three additional cards, the player needs to obtain at least a straight in order to win more credits than the player has wagered (10 versus 8 credits). If the player purchases two cards, the player needs to achieve three-of-a-kind in order to win more than the player has wagered (5 versus 4 credits). If the player purchases only one additional card, the player needs to achieve at least two pairs in order to win more than the player has wagered (3 versus 2 credits). If the player decides not to purchase any additional cards, the player needs to achieve at least a pair of aces in order to win more than the player has wagered.

It should be appreciated that those skilled in the art could modify the wager/paytable of FIG. 4 without departing from the scope of the present invention. In one preferred embodiment, each additional card costs an additional amount. In one embodiment this increases exponentially, although it can increase, decrease or remain the same in any suitable manner desired by the game implementor.

Referring now to FIG. 5, a number of trials are illustrated showing various different types of outcomes of the multiple additional purchasable option cards of the present invention. The top row of the chart sets forth a column for the total amount of credits wagered and separates the trials from one another. The second row shows the results of various trials for the pre-option hand. Again the pre-option hand is either a stud hand or a draw hand after the player has replaced one or more cards or decided to keep an additionally dealt hand. In one embodiment, the pre-option hand costs one credit to obtain. The remainder of the rows show results for the trials including the additionally purchased cards.

In Trial 1, the player is dealt initially the queen of hearts, the seven of hearts, the three of clubs, the two of spades and the two of diamonds. At this point in the game, the player's best win is no credits. The player could fold, but the player sees an opportunity to obtain three two's and win five credits according to the paytable of FIG. 4. Accordingly, the player chooses to purchase a card and is dealt the ten of hearts as illustrated in the third row. At that point, the player has wagered a total of two credits and the player's best win is still zero credits. Again, the player could fold but the player sees an opportunity to possibly win a flush (has three of five hearts), and so the player selects again to purchase an additional card. In the fourth row, gaming device 10 has provided an additional card of the four of clubs. The player's best win is still zero credits, while the player has wagered four credits. The player accordingly decides to fold and cut the player's losses, wherein the player winds up receiving no credits from any payouts.

Trial 2 proceeds in the same way as described above in connection with Trial 1. After purchasing two cards, the player obtains two pairs and accumulates a two credit win but at the same time has wagered four credits. The player continues to purchase cards and after purchasing all five cards achieves a full house of sixes over aces. The full-house pays thirty credits but the player has wagered thirty-two credits, so that the player's net result is the loss of two credits. However, for two credits the player has played a fun and exciting round of poker and has had the thrill of purchasing five additional cards.

In Trials 3 and 4, the player very quickly in the game accrues more credits in the form of a payout then the player has wagered. Accordingly, the player decides to keep the accumulated win, end the instant game, and either cash out or begin a new game of gaming device 10.

It should be appreciated by one skilled in the art that the process of FIG. 3, the wagering scheme and paytables of FIG. 4, as well as the examples set forth in FIG. 5 could be implemented over a data network, such as over a central determination network or an internet. Further, the game disclosed herein could be implemented at a gaming table of a casino or gaming establishment.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A method of operating a poker game, said method comprising:

(a) receiving an initial wager from a player;

(b) dealing a hand of cards to the player, said hand of cards including a first plurality of cards from a deck of cards;

(c) dealing a second plurality of cards to the player from the deck of cards, said second plurality of cards dealt face-down to the player;

(d) enabling the player to end the poker game or purchase one of the second plurality of cards to add to the player's hand for an additional wager, and (e) repeating (d) until the player ends the poker game or until there are no remaining cards in the second plurality of cards for the player to purchase, wherein each time the player purchases one of the second plurality of cards, one of the cards from the second plurality of cards is added to the player's hand without regard to any of the cards already in the player's hand and such that the quantity of cards in the player's hand increases; and (f) when the player ends the poker game or when there are no cards remaining in the second plurality of cards for the player to purchase, evaluating the cards in the player's hand including all of the purchased cards and providing an award to the player if the player's hand includes a winning combination of cards.

2. The method of claim 1, which includes dealing at least one of the first plurality of cards in the hand face-up to the player.

3. The method of claim 2, which includes displaying the added one of the cards face-up to the player if the player purchases one of the second plurality of cards to add to the hand.

4. The method of claim 1, which includes dealing a plurality of the first plurality of cards in the hand face-up to the player.

5. The method of claim 4, which includes displaying the added one of the cards face-up to the player if the player purchases one of the second plurality of cards to add to the hand.

6. The method of claim 1, which includes dealing all of the first plurality of cards in the hand face-up to the player.

7. The method of claim 6, which includes displaying the added one of the cards face-up to the player if the player purchases one of the second plurality of cards to add to the hand.

8. The method of claim 1, which includes enabling the player to select which of the second plurality of cards to add to the hand if the player purchases one of the second plurality of cards to add to the hand.

9. The method of claim 1, wherein the first plurality of cards and the second plurality of cards each include a same number of the cards.

10. The method of claim 1, wherein the additional wager for each sequential purchase of one of the cards in the second plurality of cards is greater than the additional wager for the previous purchase of one of the cards in the second plurality of cards.

11. The method of claim 1, wherein the additional wager for each sequential purchase of one of the cards in the second plurality of cards is equal to a total amount wagered in the poker game prior to said purchase.

12. The method of claim 1, wherein the additional wager for each sequential purchase of one of the cards in the second plurality of cards is equal to 2n times the initial wager, wherein n=0 for a first one of the purchased cards and increases by one for each additional purchased card.

13. The method of claim 1, wherein the deck of cards includes a standard deck of 52 cards and the winning combination of cards include at least one of the results selected from the group consisting of: a pair of aces, two pairs, three-of-a-kind, a straight, a flush, a full house, four-of-a-kind, a straight flush and a royal flush.

14. The method of claim 1, which is operated via a data network.

15. The method of claim 14, wherein the data network is an internet.

16. The method of claim 1, wherein the cards are virtual and are displayed by a display device of a gaming machine.

17. A memory device which stores computer instructions for implementing (a) to (f) of the method of claim 1.

18. A method of operating a poker game, said method comprising:

(a) receiving an initial wager from a player;

(b) dealing a hand of cards to the player, said hand of cards including a first plurality of cards from a deck of cards;

(c) enabling the player to end the poker game or purchase one of a second plurality of cards to add to the player's hand for an additional wager, wherein the number of second plurality of cards is predetermined, and (d) repeating (c) until the player ends the poker game or until there are no remaining cards in the second plurality of cards for the player to purchase, wherein each time the player purchases one of the second plurality of cards, one of the cards from the second plurality of cards is added to the player's hand without regard to the cards already in the player's hand and such that the quantity of cards in the player's hand increases; and (e) when the player ends the poker game or when there are no cards remaining in the second plurality of cards, evaluating the cards in the player's hand including all of the purchased cards and providing an award to the player if the player's hand includes a winning combination of cards.

19. The method of claim 18, which includes dealing at least one of the first plurality of cards in the hand face-up to the player.

20. The method of claim 19, which includes displaying the added one of the cards face-up to the player if the player purchases one of the second plurality of cards to add to the hand.

21. The method of claim 18, which includes dealing a plurality of the first plurality of cards in the hand face-up to the player.

22. The method of claim 21, which includes displaying the added one of the cards face-up to the player if the player purchases one of the second plurality of cards to add to the hand.

23. The method of claim 18, which includes dealing all of the first plurality of cards in the hand face-up to the player.

24. The method of claim 23, which includes displaying the added one of the cards face-up to the player if the player purchases one of the second plurality of cards to add to the hand.

25. The method of claim 18, which includes enabling the player to select which of the second plurality of cards to add to the hand if the player purchases one of the second plurality of cards to add to the hand.

26. The method of claim 18, wherein the first plurality of cards and the second plurality of cards each include a same number of the cards.

27. The method of claim 18, wherein the additional wager for each sequential purchase of one of the cards in the second plurality of cards is greater than the additional wager for the previous purchase of one of the cards in the second plurality of cards.

28. The method of claim 18, wherein the additional wager for each sequential purchase of one of the cards in the second plurality of cards is equal to a total amount wagered in the poker game prior to said purchase.

29. The method of claim 18, wherein the additional wager for each sequential purchase of one of the cards in the second plurality of cards is equal to 2n times the initial wager, wherein n=0 for a first one of the purchased cards and increases by one for each additional purchased card.

30. The method of claim 18, wherein the deck of cards includes a standard deck of 52 cards and the winning combination of cards include at least one of the results selected from the group consisting of: a pair of aces, two pairs, three-of-a-kind, a straight, a flush, a full house, four-of-a-kind, a straight flush and a royal flush.

31. The method of claim 18, which is operated via a data network.

32. The method of claim 31, wherein the data network is an internet.

33. The method of claim 18, wherein the cards are virtual and are displayed by a display device of a gaming machine.

34. A memory device which stores computer instructions for implementing steps (a) to (e) of the method of claim 18.

35. A method of operating a poker game, said method comprising:

(a) receiving an initial wager from a player;

(b) dealing a hand of cards face-up to the player, said hand of cards including a first plurality of cards from a standard deck of 52 cards;

(c) dealing a second plurality of cards face-down to the player from the deck of cards;

(d) enabling the player to end the poker game or purchase one of the second plurality of cards to add to the player's hand for an additional wager, (e) repeating step (d) until the player ends the poker game or until there are no remaining cards in the second plurality of cards for the player to purchase, wherein each time the player purchases one of the second plurality of cards, one of the second plurality of cards is displayed to the player and added to the player's hand without regard to the cards already in the player's hand and such that the quantity of cards in the player's hand increases, and wherein the additional wager for each sequential purchase of one of the cards in the second plurality of cards is greater than the additional wager for the previous purchase of one of the cards in the second plurality of cards; and (f) when the player ends the poker game or when there are no remaining cards in the second plurality of cards for the player to purchase, evaluating the cards in the player's hand including all of the purchased cards, and providing an award to the player if the player's hand includes a winning combination of cards.

36. The method of claim 35, wherein the first plurality of cards and the second plurality of cards each include a same number of the cards.

37. The method of claim 35, wherein the additional wager for each sequential purchase of one of the cards in the second plurality of cards is equal to a total amount wagered in the poker game prior to said purchase.

38. The method of claim 35, wherein the additional wager for each sequential purchase of one of the cards in the second plurality of cards is equal to 2n times the initial wager, wherein n=0 for a first one of the purchased cards and increases by one for each additional purchased card.

39. The method of claim 35, which is operated via a data network.

40. The method of claim 39, wherein the data network is an internet.

41. The method of claim 35, wherein the cards are virtual and are displayed by a display device of a gaming machine.

42. A memory device which stores computer instructions for implementing steps (a) to (f) of the method of claim 35.

43. A method of operating a poker game comprising:

(a) dealing randomly a hand of cards including a plurality of cards from a standard deck of 52 cards face-up to a player;

(b) enabling the player to sequentially purchase a plurality of additional cards one at a time to add to the player's hand, wherein the purchase of each additional card increases sequentially in cost;

(c) each time the player purchases one of the additional cards, adding said purchased additional card to the player's hand, without regard to the cards already in the player's hand, such that the quantity of cards in the player's hand increases; and (d) when the player chooses not to purchase any of the or more of the additional cards or if no more additional cards remain to purchase, evaluating the player's hand including all of the purchased additional cards for winning combinations, and providing an award to the player for the highest value winning combination in the player's hand.

44. The method of claim 43, wherein the cost for each sequential purchase of the additional card is equal to a total amount wagered in the poker game prior to said purchase.

45. The method of claim 43, wherein the cost for each sequential purchase of the additional card is equal to 2n times an initial wager, wherein n=0 for a first one of the additional cards and increases by one for each additional card.

46. The method of claim 43, which is operated via a data network.

47. The method of claim 45, wherein the data network is an internet.

48. The method of claim 43, wherein the cards are virtual and are displayed by a display device of a gaming machine.

49. A memory device which stores computer instructions for implementing steps (a) to (d) of the method of claim 43.

50. The method of claim 1, wherein the first plurality of cards includes five cards.

51. The method of claim 50, which includes evaluating the cards in the player's hand including all of the purchased cards for a highest value winning combination of five cards.

52. The method of claim 18, wherein the first plurality of cards includes five cards.

53. The method of claim 52, which includes evaluating the cards in the player's hand including all of the purchased cards for a highest value winning combination of five cards.

54. The method of claim 35, wherein the first plurality of cards includes five cards.

55. The method of claim 35, which includes evaluating the cards in the player's hand including all of the purchased cards for a highest value winning combination of five cards.

56. The method of claim 43, wherein said plurality of cards includes five cards.

57. The method of claim 43, which includes providing an award to the player for the highest value winning combination of five cards in the player's hand.

* * * * *